No. 669,367. Patented Mar. 5, 1901.
J. F. MEIGS & R. P. STOUT.
SUPPORT FOR FIELD GUNS.
(Application filed Oct. 10, 1900.)
(No Model.) 5 Sheets—Sheet 2.
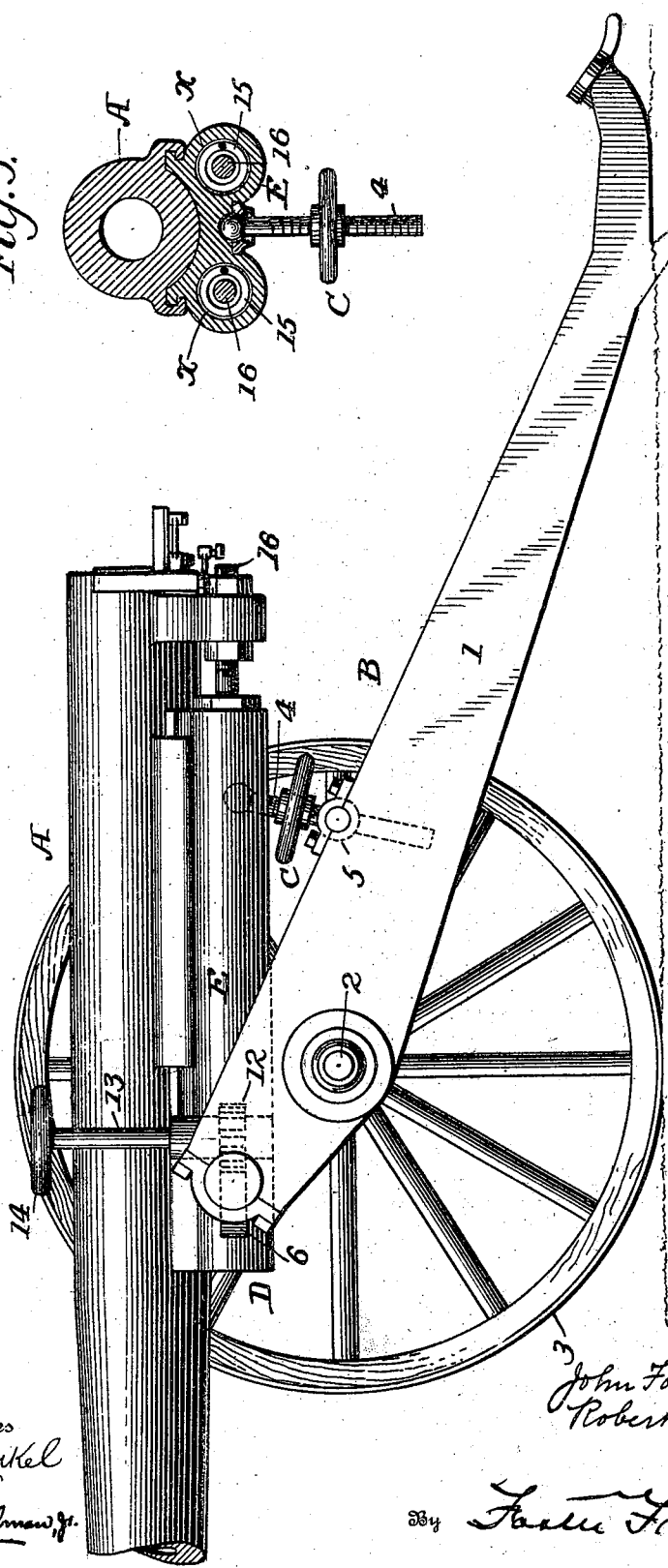
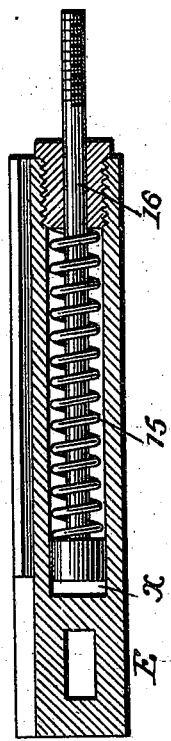

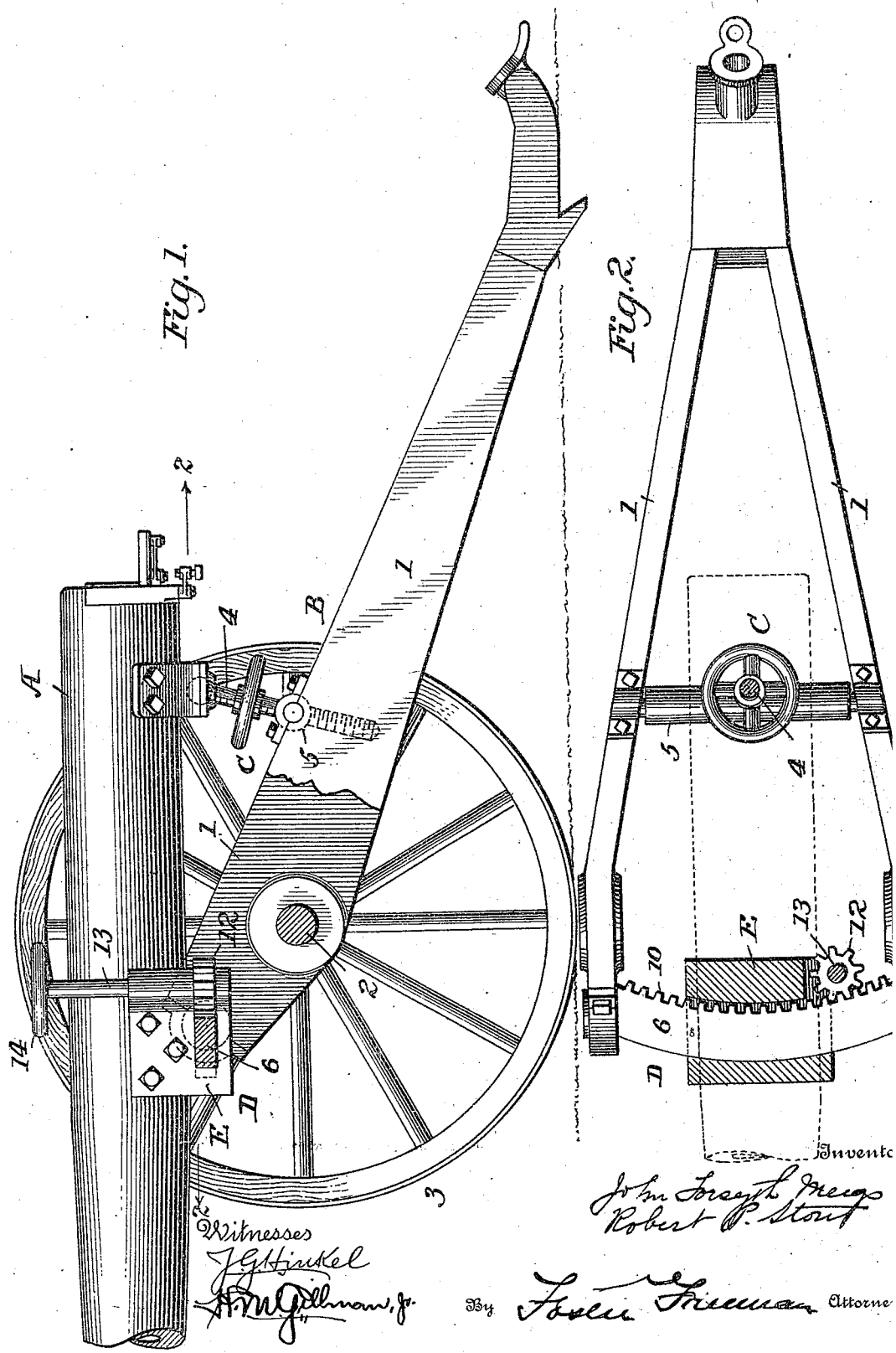

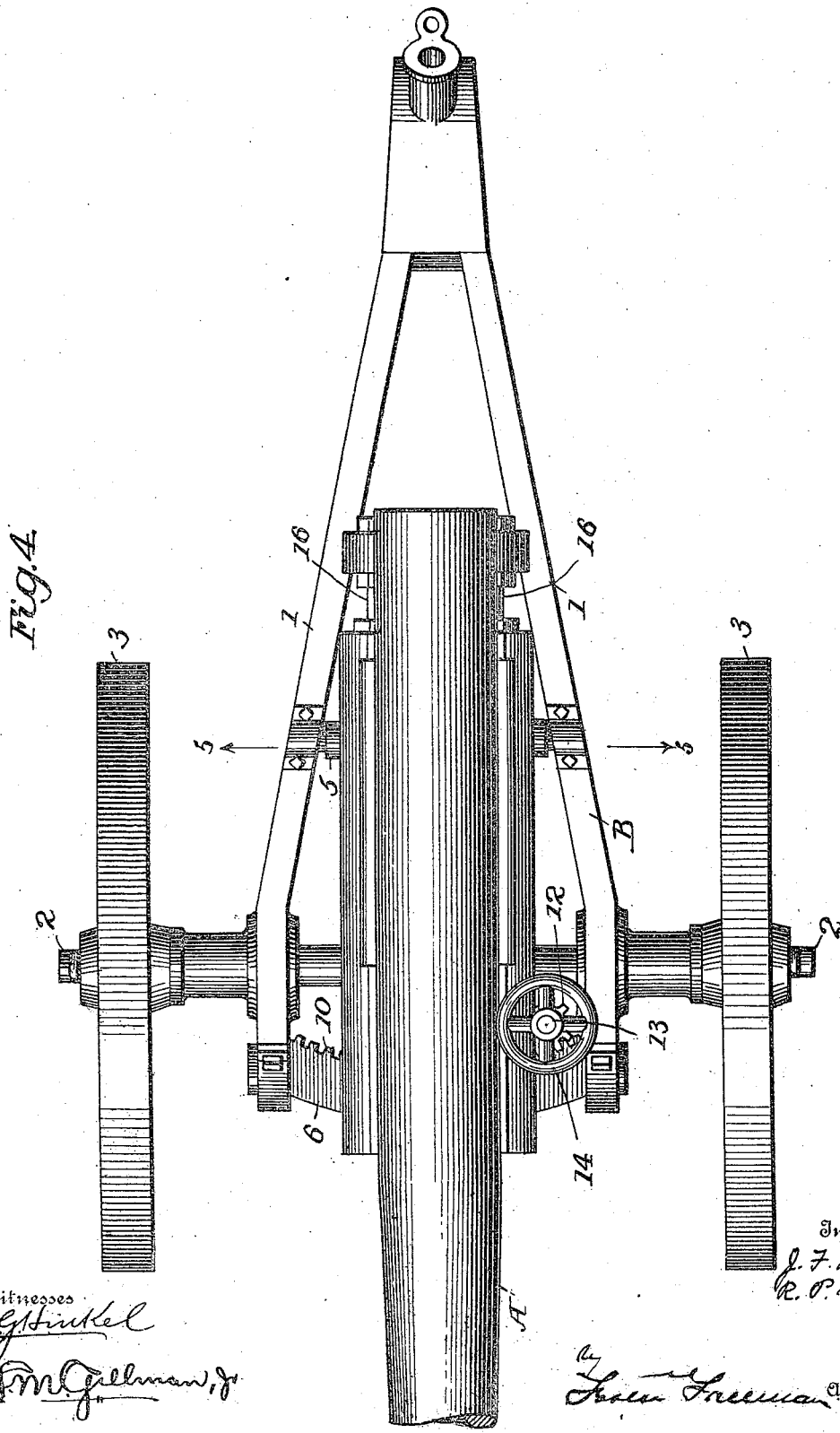

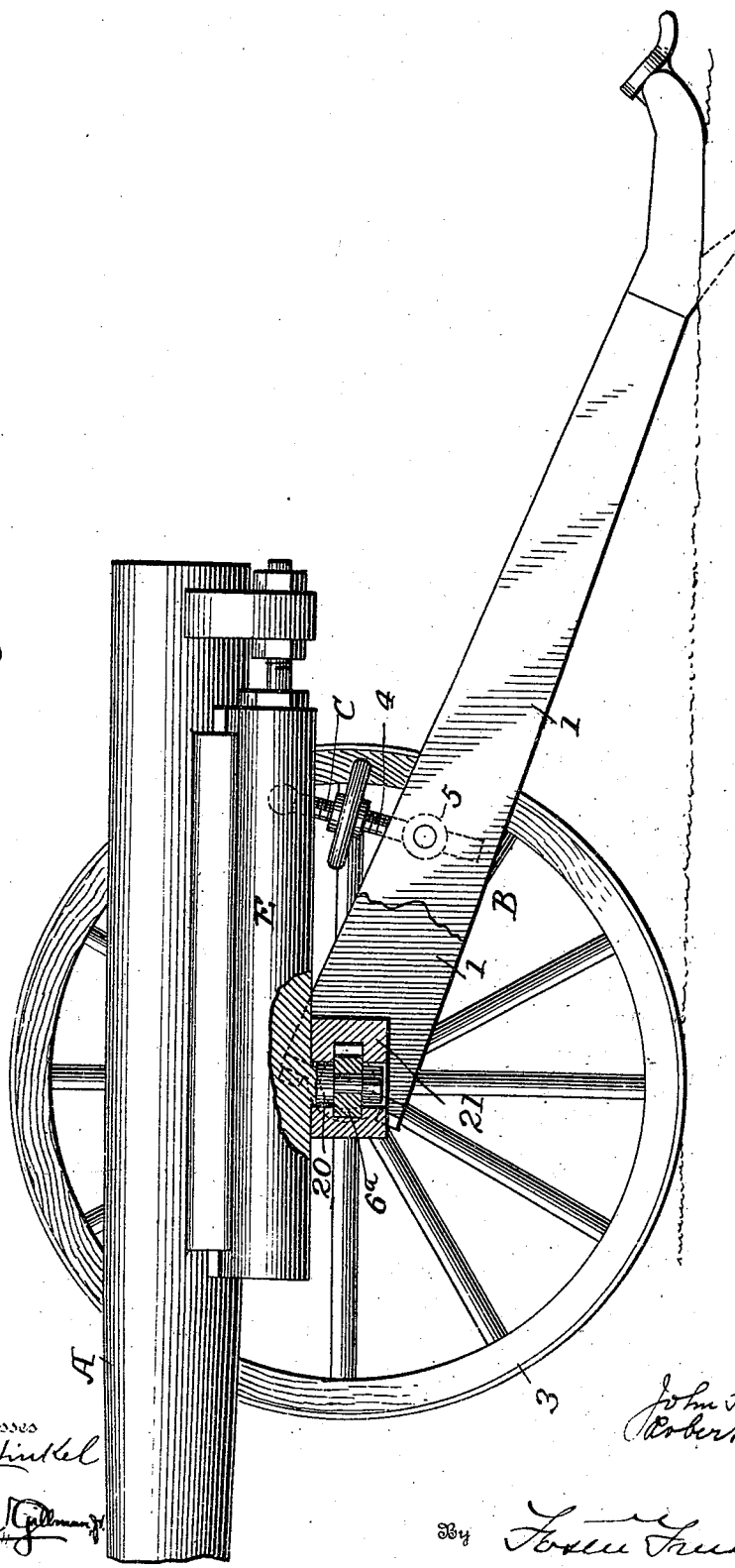

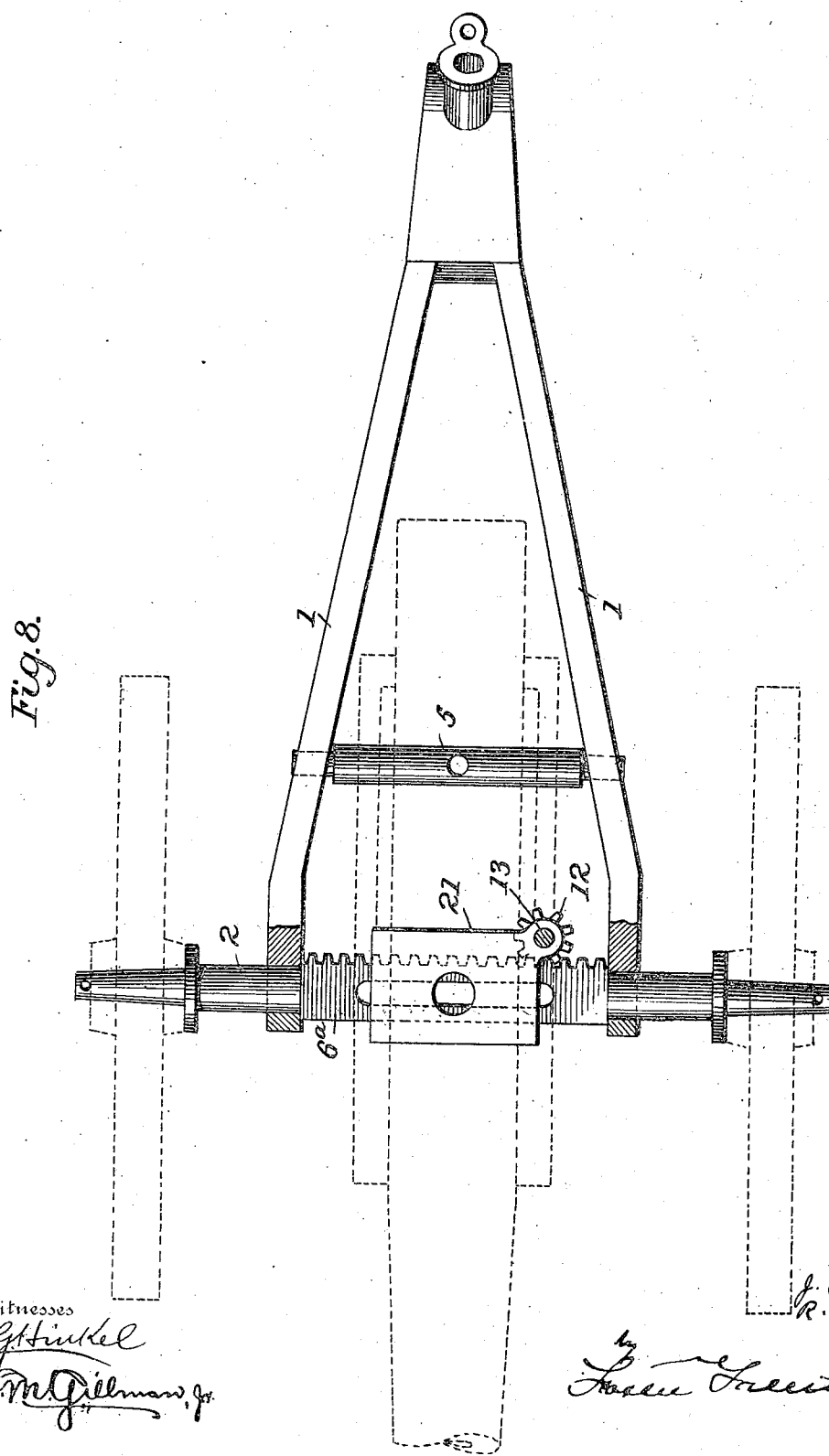

UNITED STATES PATENT OFFICE.

JOHN FORSYTH MEIGS AND ROBERT P. STOUT, OF BETHLEHEM, PENNSYLVANIA, ASSIGNORS TO THE BETHLEHEM STEEL COMPANY, OF SAME PLACE.

SUPPORT FOR FIELD-GUNS.

SPECIFICATION forming part of Letters Patent No. 669,367, dated March 5, 1901.

Application filed October 10, 1900. Serial No. 32,636. (No model.)

*To all whom it may concern:*

Be it known that we, JOHN FORSYTH MEIGS and ROBERT P. STOUT, citizens of the United States, residing at Bethlehem, in the county of Northampton and State of Pennsylvania, have invented certain new and useful Improvements in Supports for Field-Guns, of which the following is a specification.

Our invention relates to field-pieces, and especially to the mounting or support for the gun on its carriage; and to this end our invention consists in mounting the gun on the carriage so that it may be both rocked vertically and swung laterally on its forward support, as fully set forth hereinafter and as illustrated in the accompanying drawings, in which—

Figure 1 is a side elevation, partly in section, of a field-piece, showing our improvements. Fig. 2 is a section on the line 2 2, Fig. 1. Fig. 3 is a side elevation, one cheek-piece of the carriage removed, showing our invention in connection with recoil means. Fig. 4 is a plan of Fig. 3; Fig. 5, a transverse section on the line 5 5, Fig. 4, and Fig. 6 a vertical longitudinal section through one of the brake-cylinders. Fig. 7 is a vertical section illustrating a modification, and Fig. 8 a sectional plan of Fig. 7.

The gun or barrel A, provided with any suitable breech mechanism, is supported on a carriage B, having cheek-pieces 1 1, terminating in a trail and provided with an axle 2, to which are fitted the wheels 3 3, as usual. The gun has two supports—a rear support C, which, as shown, is an elevating-screw 4, turning in a rocking cross-piece 5, while the forward support D is constructed in any suitable manner, so that the gun can rock on or with the support at this point to change the elevation and also so that it can swing or move laterally about the rear support as a center to afford a change of azimuth without varying the position of the carriage.

The rear support may consist of any suitable elevating means, and the forward support may be constructed in any suitable manner to permit the gun to swing laterally about the rear support as a center and also to rock at the point of forward support. As shown, the forward support is a transverse rocking bar 6, formed at the ends into trunnions rocking in cheeks of the carriage and curved to correspond to part of a circle, of which the rear support is the center, the curved part of the bar fitting a transverse opening in a block connected to or carrying the barrel or may be the main axle of the carriage. As shown in Figs. 1 and 2, the block E is a projection on the barrel. In Figs. 3 and 4 it is a cradle in which the barrel slides. In either case the gun can move or swing laterally to change the azimuth and also rock upon or with the forward support under the action of the elevating means C.

Any suitable means may be employed to shift or move the gun laterally in respect to the carriage. As shown, the bar 6 is provided with rack-teeth 10, with which engages a pinion 12, turned directly or indirectly from a shaft 13, provided with a hand-wheel 14 and turning in bearings of the block E.

Where recoil means are not required, the block E may be a fixed attachment to or projection of the barrel; but where it is desired to reduce the effects of recoil the block E, as shown in Figs. 3, 4, 5, and 6, may be a cradle which is supported by the front and rear supports, as described, and the barrel slides on this cradle.

Any suitable recoil-brake means may be employed—as, for instance, a liquid, gas, or spring—in one or more openings $x$ in the cradle, and pistons 15 on rods 16 fit the openings and bear on the springs or other means for gradually accumulating resistance to the rearward movement of the gun, the rods 16 being connected at their rear ends with the barrel. By thus forming the compressor or recoil chambers in the cradle the number of elements in the structure is reduced.

In Figs. 7 and 8 the forward support is in fact the axle, which may be curved, or, as shown, may be a straight cross-bar $6^a$ with end trunnions, which may be prolonged to form the axles of the wheels, and the gun-cradle E' has a stud 20 fitted to a socket in a slide 21, sliding on the cross-bar $6^a$ under the action of the hand-wheel 14 and gearing before described. In this case the gun moves slightly forward and back in swinging to either side and the rear supporting-screw accommodates itself to this movement, as it is supported in the rocking cross-bar 5 and has a universal jointed connection with the cradle. Of course the same results would be secured, except reducing recoil, if the cradle were dispensed with and the barrel rested directly on the slide 21. It will be seen that in each form and arrangement illustrated the barrel, or the barrel and its cradle, has two movements independent of the carriage: first, a movement of elevation, and, second, an azimuth movement, thus permitting a change of range and train without any adjustment of the carriage.

Without limiting ourselves to any specific construction of supporting devices, we claim as our invention—

1. The combination with a gun-carriage, of a rear and a forward support for the gun, a gun supported on said forward support to have a rocking movement and also a transverse movement about the rear support as a center, and means for imparting such movements, substantially as set forth.

2. The combination with a gun-carriage, of an elevating-screw for the breech of the gun, and a forward support, a gun resting on said support, and means for moving the gun laterally about the said screw as a center, substantially as set forth.

3. The combination with a gun-carriage, of a cradle, a gun longitudinally movable on the cradle, an elevating-screw at the rear of the cradle, a forward support for the cradle, and means for moving the forward end of the cradle laterally about the said screw as a center, substantially as set forth.

4. A field-piece provided with a carriage, a cradle, a gun movable on the cradle longitudinally, supports on the carriage for the forward and rear ends of the cradle, and means for moving the cradle laterally about the rear support as a pivot and for rocking the same, substantially as set forth.

5. The combination with a gun-carriage, of a cradle, a gun longitudinally movable on the cradle, recoil-cylinders on the cradle, means therein for checking the recoil of the gun, an elevating-screw at the rear of the cradle, a forward support for the cradle, and means for moving the forward end of the cradle laterally about said screw as a center, substantially as set forth.

6. The combination with a gun-carriage and its gun, of an axle constituting a forward support for the gun, a rear support for the gun, means for moving the gun laterally on its forward support about the rear support as a center and independently of the carriage, and means for changing the elevation at the rear, substantially as set forth.

7. The combination with a gun and its carriage, of forward and rear supports for the gun, the forward support curved to correspond to a part of a circle having the rear support as its center, and means for moving the gun laterally on its forward support and for changing the elevation at the rear, substantially as set forth.

In testimony whereof we have signed our names to this specification in the presence of two subscribing witnesses.

JOHN FORSYTH MEIGS.
ROBERT P. STOUT.

Witnesses:
JAMES KERNAN,
C. O. BRUNNER.